UNITED STATES PATENT OFFICE 2,303,362

PROCESS FOR THE PRODUCTION OF ISOBUTYLENE AND ITS DIMER

Alfred Claude Jessup, Clamart, France, assignor to Charles Weizmann, London, England No Drawing. Application November 16, 1939, Serial No. 304,861. In France December 5, 1938

7 Claims. (Cl. 260—683)

It has long been known that iso-octane (2.4.4.-trimethyl-pentane), is a most efficient antidetonator and that it can be produced by dimerisation of isobutylene and hydrogenation of the unsaturated dimer thus obtained.

In order to produce antidetonators, one has also in the past dimerised butylenes having normal chains or their mixtures with isobutylene, and one has then hydrogenated the products so obtained. This reaction results in isomers of iso-octane which have a certain value as antidetonators, but which are inferior to the hydrogenated dimer of isobutylene.

The present invention has for its object the production of isobutylene or its dimer starting from straight chain butylene, such as may, for example, be obtained in the gases formed in cracking or from the dehydration of butyl-alcohol.

My invention consists in causing a halogen acid, such as for example hydrochloric acid, to react on butylenes with straight chains or on mixtures of these butylenes with other gases. This results in the formation of secondary butyl chloride which is then treated by heat in the presence of certain inorganic halides such as aluminium chloride, ferric chloride, beryllium chloride, or similar chlorides. The temperature is preferably of the order of 300° to 500° C.

In these conditions the butylene $$CH_2=CH-CH_2-CH_3$$

or its isomer $CH_3-CH=CH-CH_3$, fixes a molecule of hydrochloric acid, giving rise to:

Under the influence of the metallic chloride catalyst of the class mentioned above, the molecules regroup themselves giving tertiary butyl chloride.

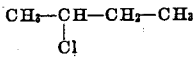

This in its turn decomposes under the influence of the halide catalysts into HCl and isobutylene (branched chain compound)

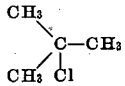

The isobutylene can then be isolated or immediately dimerised by any appropriate known process.

The gases leaving the reaction chamber contain a certain quantity of butylene which is easily separated from isobutylene, as for example by solution in cold 60% sulfuric acid.

As an example and in order to facilitate the description of my process the following is one means of carrying it out which has given satisfactory results.

90 liters of butylene obtained from the dehydration of butyl alcohol by means of aluminium oxide are mixed with 90 liters of gaseous hydrochloric acid. The mixture is then passed over 50 grams of anhydrous aluminium chloride in a tube 1 metre in length heated for preference to 350° C.; but higher temperatures up to 500° C. may also be employed. The gases leaving the reaction tube are cooled to a temperature of 30° C. in order to separate the slight quantity of butyl chlorides which has not been transformed, and then treated in the cold with 60% sulfuric acid. That portion of the gas which does not dissolve is pure butylene and is reintroduced into the cycle by means of a fan. Isobutylene or its dimer can then be isolated from the acid solution.

80 grs. of isobutylene are obtained while about 110 grs. or 45 litres of butylene gas remain unconverted. At a temperature of 30°, 20 grs. of chloride condense and can be reintroduced into the cycle.

It is of course possible to carry through an analogous operation using as raw material the isomers of butyl chloride either pure or mixed, instead of butylene. One can also substitute hydrobromic acid for hydrochloric acid.

In the above example the quantity of hydrochloric acid is equal (by volume) to that of butylene, but it is by no means essential to maintain this ratio, and it is possible to carry out my invention using 10 to 20% of the theoretical quantity.

I claim:

1. A process which comprises reacting upon a straight chain butylene with at least 10% by volume of a hydrogen-halogen acid, subjecting the resulting butyl halide to contact with a catalyst selected from the group consisting of aluminum chloride, ferric chloride and beryllium chloride, at about 300 to 500° C., condensing out any remaining butyl chloride in the gas mixture, and separately removing isobutylene and straight chain butylene from the gases, the butyl chloride and straight chain butylene being reintroduced into the process.

2. A process which comprises reacting upon a straight chain butylene with at least 10% by volume of a hydrogen-halogen acid, subjecting the resulting butyl halide to contact with anhydrous aluminum chloride as a catalyst, at about 300 to 500° C., condensing out any remaining butyl chloride in the gas mixture, and separately removing isobutylene and straight chain butylene from the gases, the butyl chloride and straight chain butylene being reintroduced into the process.

3. A process of producing isobutylene and its dimer, which comprises subjecting straight chain monochlorbutane, to heat at about 350 to 500° C., in the presence of a metallic chloride catalyst selected from the group consisting of aluminum chloride, ferric chloride and beryllium chloride.

4. A process of producing isobutylene and its dimer, which comprises forming a mixture containing a straight chain butylene and, by volume, at least 10% but not considerably over 50% of an acid selected from the group consisting of hydrochloric acid and hydrobromic acid, and passing such gaseous mixture in contact with a catalyst selected from the group consisting of aluminum chloride, ferric chloride and beryllium chloride, at about 350 to 500° C.

5. A process as covered in claim 3, in which the monochlorbutane is secondary butyl chloride.

6. A process as covered in claim 3, in which the monochlorbutane is produced by causing hydrochloric acid to react on a straight chain butylene.

7. A process of producing isobutylene and its dimer, which comprises subjecting a straight monohalogen substituted butane to heat at 300 to 500° C., in the presence of a metallic chloride catalyst selected from the group consisting of aluminum chloride, ferric chloride and beryllium chloride, and thereafter cooling the reaction products.

ALFRED CLAUDE JESSUP.